Figure 1:
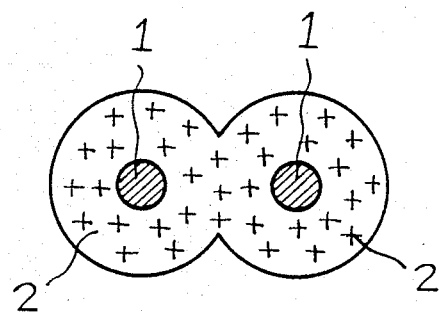

United States Patent [19]

Thebault

[11] Patent Number: 4,748,079
[45] Date of Patent: May 31, 1988

[54] COMPOSITE MATERIALS CONSTITUTED BY A MATRIX IN RESIN COKE CARBON, REINFORCED WITH PYROLYTIC CARBON-COATED REFRACTORY FIBERS

[75] Inventor: Jacques Thebault, Bordeaux, France

[73] Assignee: Societe Europeenne de Propulsion, Puteaux, France

[21] Appl. No.: 788,105

[22] Filed: Oct. 16, 1985

Related U.S. Application Data

[63] Continuation of Ser. No. 599,259, Apr. 11, 1984, abandoned.

[30] Foreign Application Priority Data

Apr. 19, 1983 [FR] France .................................. 83 06369

[51] Int. Cl.⁴ .......................... B32B 9/00; D04H 1/58
[52] U.S. Cl. .................................... 428/288; 428/367; 428/408; 428/378
[58] Field of Search .............. 428/367, 368, 408, 378, 428/375, 288; 423/447.1, 447.2

[56] References Cited

U.S. PATENT DOCUMENTS

| | | | |
|---|---|---|---|
| 3,573,086 | 3/1971 | Lambdin | 428/367 X |
| 3,629,049 | 12/1971 | Olcott | 428/368 X |
| 3,826,707 | 7/1974 | Olcott | 428/368 X |
| 3,908,061 | 9/1975 | Byrne et al. | 428/368 X |
| 3,991,248 | 11/1976 | Bauer | 428/260 |
| 4,201,611 | 5/1980 | Stover | 428/368 X |
| 4,318,948 | 3/1982 | Hodgson | 428/367 X |
| 4,339,021 | 7/1982 | Kosuda et al. | 428/368 X |

Primary Examiner—Lorraine T. Kendell
Attorney, Agent, or Firm—Shenier & O'Connor

[57] ABSTRACT

The present invention relates to a composite material, of the type comprising a matrix in resin coke carbon and a refractory fibrous reinforcement, wherein the elementary fibers composing the fibrous reinforcement are coated before use with a layer of pyrolytic carbon the thickness of which layer can vary between 0.01 μm and 1.0 μm.

The invention further relates to a method for preparing said material.

4 Claims, 1 Drawing Sheet

COMPOSITE MATERIALS CONSTITUTED BY A MATRIX IN RESIN COKE CARBON, REINFORCED WITH PYROLYTIC CARBON-COATED REFRACTORY FIBERS

This is a continuation of co-pending application Ser. No. 599,259 filed on Apr. 11, 1984 abandoned.

The present invention relates to composite materials constituted by a matrix in resin coke carbon, reinforced with pyrolytic carbon-coated refractory fibers, and method of obtaining same.

The coating of carbon fibers with pyrolytic carbon or "pyrocarbon" has already been described. The resulting products (coated fibers) have been used in the preparation of composite materials which comprise such coated fibers and a matrix composed of an organic resin. The resulting composite materials have improved mechanical properties over the corresponding materials obtained with carbon fibers non-coated with pyrocarbon. This improvement in the properties is due to an increase in the bonding forces between the coated carbon fibers and the resin used for the matrix.

Composite materials have also already been described, of the type constituted by reinforcement fibers (between 5 and 65% in volume of carbon fibers or silicium carbide fibers, for example) in a carbon matrix, such as a matrix in resin coke. Said materials are obtained by carbonization of a preform constituted of reinforcement fibers with an organic resin.

It has been found, and this is the object of the present invention, that the properties of the aforesaid composite materials, constituted of reinforcement fibers (in carbon or silicon carbide for example) and of a carbon matrix, are provided when pyrocarbon coated reinforcement fibers are used in their preparation.

The action of the pyrocarbon deposited on the refractory fibers is different:

on the one hand, from the ways said pyrocarbon acts in the composite materials containing carbon fibers and an organic resin, and on the other hand, from the way said pyrocarbon acts in the preparation of materials containing (pyrocarbon coated) reinforcement fibers and tar, which is subsequently decomposed to produce a coke; indeed, the beneficial action of pyrocarbon occurs when the resin (precursor of resin coke) is transformed into resin coke.

The non-obviousness of the invention resides therefore in that:

on the one hand, it has been found that in the composite materials based on carbon fibers and resin coke carbon matrix, it is necessary, in order to improve the properties, to initially ensure a reduction of the bonding forces between fibers and matrix, and on the other hand, it has been found that it is possible to obtain this reduction of the bonding forces, by coating the carbon fibers with pyrolytic carbon.

The present invention therefore relates to new composite products, with improved properties, and comprising reinforcement fibers and a carbon matrix, wherein each fibrous reinforcement fiber has been coated beforehand with carbon obtained by chemical vapor deposition. As suitable reinforcement fibers (fibrous reinforcement) it is possible to use any known product of this type used in composite materials, such as for example carbon fibers, silicon carbide fibers, other carbides fibers, boron or boron nitride fibers, etc.

The only condition being that the fiber must be sufficiently refractory to withstand the pyrocarbon coating ($T \simeq 1000°$ C.) without any real damage.

Said reinforcement fibers may be used in any known forms such as for example tows, fabrics, plats, felts, etc.

One particular important point to be noted is that the thickness of the pyrocarbon deposited on the elementary fibers are deliberately limited. The advantage of this being that the elementary layer (tow, fabric, felt . . . ) retains a suppleness and non-brittleness which is really important in that it enables a deformation of the layer and permits, by molding for example, to obtain a complex form without damaging said layer. Such limited thickness further permits to differentiate this type of preparation and material from the carbon-carbon composites with matrices originally i.e. in contact with the fibers in pyrocarbon which are also known. Indeed, in this last type of material, the pyrocarbon coating is thick (thickness 5 $\mu$m for example) and makes the mechanical bond between two adjacent fibers (FIG. 1) whereas in the present invention, the resin coke makes the bond, since the pyrocarbon deposit is thin (FIG. 2) and therefore the elementary fibers remain individualized after the treatment according to the invention. Advantageously, the thickness of said layer of pyrocarbon is between 0.01 $\mu$m and 1.0 $\mu$m.

Figure 2:
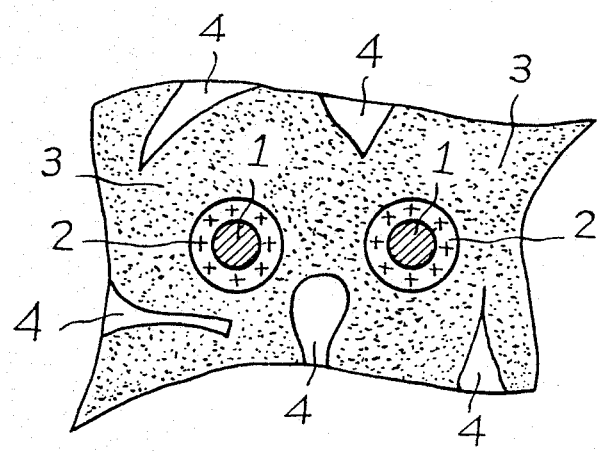

FIGS. 1 and 2 illustrate the invention and show diagrammatically a section of the material according to the prior art (FIG. 1) and according to the invention (FIG. 2).

Both Figures show the reinforcement fibers 1 and 2, the pyrocarbon 2 (which, in the prior art, makes the bond between the fibers, and which, in the invention, will ultimately be densifiable).

Carbon (or resin coke as otherwise designated in the conventional method for producing said carbon) is used for the matrix 3. But the word matrix does not imply that the whole space situated between the reinforcement fibers is occupied by a single material. Experience has indeed shown that to produce a material composed of reinforcement fibers embedded in a carbon matrix, by heating a material composed of reinforcement fibers and an adequate resin, said resin, by being pyrolyzed and converted into carbon, gives a material with a certain porosity (porosity which varies in shape and volume with the type of reinforcement used, with the type of resin used and with the operational conditions); in this case, the carbon matrix is therefore formed essentially by carbon disposed around the reinforcement fibers, but said matrix comprises and defines "channels" 4.

It is known that, in order to obtain the final material, such "channels" may be filled with different materials such as carbon (pyrocarbon, resin cokes, tars), organic resins, silicon carbide, metals, etc.

Then the products according to the invention can obviously contain, besides the coated reinforcement fibers and a matrix in resin coke carbon, at least another filling material such as one of the aforecited products.

It is important, according to the invention, for every fiber of the fibrous reinforcement to be coated with pyrolytic carbon.

The effect of this coating is to separate the reinforcement fiber from the resin decomposition residual, without being really able to specify at what moment exactly during the increase in temperature relative to the resin coking operation, such separation has taken place.

It is therefore imperative for each fiber to be completely coated with a layer of carbon and the method used to this effect is an already known one, called the chemical vapor deposition or infiltration method, which gives a homogeneous and regular coating of every individual fibers with carbons known as pyrolytic carbons or pyrocarbons. Such infiltration method is advantageously performed by placing the fibers (in fabric form for example) in contact with a renewed atmosphere of hydrocarbon ($CH_4$ for example) kept under reduced pressure, and by heating up to a temperature of at least 850° C.

The invention also relates to a method for preparing said new composite materials, which consists in the following successive steps:

coating the reinforcement fibers with pyrocarbon,
impregnating the coated fibers with a resin,
shaping the impregnated mass (draping, molding, densifying, ...)
polymerizing the resin (baking, postbaking)
heat-treating, in non-oxidizing atmosphere up to about 1000° C., the piece in coated fibers bonded by the resin matrix, so as to transform said resin into carbon (resin coke), a carbon-carbon composite being then obtained,
optionally conducting additional treatments such as:
densifying the resulting composite by any known means, in particular by chemical vapor process,
and/or treatment at high temperature (known as "graphitization" T>2000° C.).

Apart from coating the fibers with pyrocarbon, the different steps of the method are individually all known of any expert in the art.

The following examples are given non-restrictively to illustrate the invention.

EXAMPLE 1

A fabric of carbon fibers with high mechanical properties (such as the fiber T 300 of the company Torray) of mass/unit surface 220 g/m$^2$, is used.

This fabric is placed in a renewed atmosphere of methane ($CH_4$) at a pressure of 10 torr (1333 Pa) and the whole is heated to 1050° C. for 3 hours. At the end of this treatment, every carbon fiber has been coated with an even layer or pyrocarbon, the coating being about 0.15 μm thick.

A number of strips of the so treated fabric are then impregnated with an epoxy resin, and layers are cut from those strips of material, stacked in a mold and bonded under pressure.

The resin is thereafter polymerized in conformity with the supplier's instructions.

A plate of composite material of carbon fibers and epoxy matrix is thus obtained in which the proportion of fibers is about 50% in volume.

Said plate is placed in an oven with non-oxidizing atmosphere ($N_2$, $H_2$, $H_e$, vacuum, etc) in which the temperature gradually rises to 1000° C.

The result is a porous plate of composite material of carbon fibers and resin coke carbon matrix.

Said plate is placed in an oven for chemical vapor infiltration of pyrocarbon according to a known process, in order to densify the residual porosity of the material.

3-point bend test pieces are cut from this plate and testing shows that the material has a flexural strength $\sigma F=195$ MPa.

EXAMPLE 2

The procedure is that used in Example 1 but the fabric is not treated as described according to the invention.

Final $\sigma F$ is 70 MPa.

A comparison between examples 1 and 2 shows the improvement brought by the pyrocarbon reinforcement treatment according to the invention in the case of an epoxy resin coke.

EXAMPLE 3

A material is produced as described in example 1, but with a phenolic resin instead of an epoxy resin.

Final $\sigma F$ is 280 MPa.

EXAMPLE 4

A material is produced as described in example 3, but the fabric is not treated as described in the invention.

Final $\sigma F$ is 110 MPa.

A comparison between Examples 3 and 4 shows the improvement brought by the pyrocarbon reinforcement according to the invention in the case of a phenolic resin coke.

EXAMPLE 5

A material is produced as described in Example 1, but with a furane resin instead of an epoxy resin.

Final $\sigma F$ is 215 MPa.

EXAMPLE 6

A material is produced as described in Example 5 but the fabric is not treated as described in the invention.

Final $\sigma F$ is 90 MPa.

A comparison between Examples 5 and 6 shows the improvement brought by the pyrocarbon treatment according to the invention in the case of a furane resin.

A respective comparison of Examples 1, 3, 5 and 2, 4, 6 shows that the improvement observed when treating the reinforcement according to the invention is independent of the nature of the resin used.

EXAMPLE 7

A material is produced as described in Example 3 but the fabric used is constituted from silicium carbide SiC fibers (Trademark "NICALON" of the company NIPPON CARBON). The final result is a composite material, of silicium carbide fibers with carbon matrix whose 3-point bend flexural strength is $\sigma F=425$ MPa.

EXAMPLE 8

A composite material is produced as described in Example 7 except that the SiC fibers are not coated with pyrocarbon according to the invention.

Final $\sigma F$ is 305 MPa.

A comparison between Examples 7 and 8 shows the improvement brought by the treatment with pyrocarbon according to the invention, and a comparison between Examples 3, 7 and 4, 8 respectively, shows that the improvement observed when treating the reinforcement according to the invention is independent of the nature of the refractory reinforcement fiber used.

EXAMPLE 9

A material is produced as described in Example 3 except that a carbon fabric is used with a reduced mass/unit surface (100 g/m$^2$).

Result: $\sigma F=345$ MPa.

EXAMPLE 10

A material is produced as described in Example 9, except that the material is heat-treated at more than 2000° C. before being subjected to the final infiltration.

Result: $\sigma F = 269$ MPa.

EXAMPLE 11

A material is produced as described in Example 9 except that the fabric is not treated according to the invention with pyrocarbon.

Result: $\sigma F = 76$ MPa.

EXAMPLE 12

A material is produced according to Example 10 except that the fabric is not treated according to the invention with pyrocarbon.

Result: $\sigma F = 197$ MPa.

A comparison between Examples 9, 10, 11 and 12 shows that the improvement observed when the reinforcement is treated according to the invention is preserved, even when the material is treated at high temperature.

EXAMPLE 13

A material is produced as described in Example 3, except that a densification is carried out at the end by infiltration of silicium carbide (SiC).

Result: $\sigma F = 226$ MPa.

EXAMPLE 14

A material is produced as described in Example 13, but without treating the reinforcement with pyrocarbon, according to the invention.

Result: $\sigma F = 59$ MPa.

A comparision between Examples 13 and 14 shows that the improvement observed when the reinforcement is treated according to the invention is independent of the method used in the end to densify the porosity of the resin coke carbon matrix.

EXAMPLE 15

A material is produced as described in Example 1, but without the final densification by pyrocarbon infiltration.

Result: $\sigma F = 28$ MPa.

Interlaminar shear strength is measured.

Result: $\sigma = 0.30$ MPa.

EXAMPLE 16

A material is produced as described in Example 15 but without treating the fiber with pyrocarbon as described in the invention.

Result: $\sigma F = 45$ MPa.

Interlaminar shear strength is measured.

Result $\sigma = 0.42$ MPa.

A comparison between Examples 15 and 16 shows that the pyrocarbon treatment according to the invention really reduces the bonding forces between the fibers and the matrix.

EXAMPLE 17

A material is produced as described in Example 1 but the final densification is carried out by reimpregnation with a furane resin which is subsequently polymerized.

Result: $\sigma F = 378$ MPa.

EXAMPLE 18

A material is produced as described in Example 17 but without the treatment of the fiber with pyrocarbon as described in the invention.

Result: $F = 314$ MPa.

A comparison between Examples 17 and 18 shows that the advantage brought by the invention is preserved when the final densification is produced by any other means than by chemical vapor infiltration.

What I claim is:

1. A composite material comprising a coke matrix and a plurality of refractory reinforcement fibers disposed therein, each fiber being individually coated with a pyrolytic carbon layer by a chemical vapor deposition process, said matrix making a bond with and being disposed around each individual coated fiber, said coating layer having such properties as to reduce the bonding forces between the coated fibers and the matrix.

2. A composite material as in claim 1 wherein said coating layer has a thickness not less than 0.01 micrometer but not greater than one micrometer.

3. A composite material comprising a coke matrix and a plurality of refractory reinforcement fibers disposed therein, each fiber being individually coated with a pyrolytic carbon layer, said matrix making a bond with and being disposed around each individual coated fiber, said coating layer having such properties as to reduce the bonding forces between the coated fibers and the matrix.

4. A composite material as in claim 3 wherein said coating layer has a thickness not less than 0.01 micrometer but not more than one micrometer.

* * * * *